US012088024B2

(12) United States Patent
Wang et al.

(10) Patent No.: US 12,088,024 B2
(45) Date of Patent: Sep. 10, 2024

(54) ANTENNA HAVING HIGH ISOLATION AND LOW CROSS-POLARIZATION LEVEL, BASE STATION, AND TERMINAL

(71) Applicant: Huawei Technologies Co., Ltd., Shenzhen (CN)

(72) Inventors: Yongchao Wang, Xi'an (CN); Xiaoqiang Yang, Shenzhen (CN); Cheng Gou, Xi'an (CN); Jie Peng, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 17/794,535

(22) PCT Filed: Oct. 30, 2020

(86) PCT No.: PCT/CN2020/125207
§ 371 (c)(1),
(2) Date: Jul. 21, 2022

(87) PCT Pub. No.: WO2021/147438
PCT Pub. Date: Jul. 29, 2021

(65) Prior Publication Data

US 2023/0084643 A1 Mar. 16, 2023

(30) Foreign Application Priority Data

Jan. 22, 2020 (CN) ........................ 202010074376.2

(51) Int. Cl.
*H01Q 9/04* (2006.01)
*H01Q 1/24* (2006.01)
(Continued)

(52) U.S. Cl.
CPC ........... *H01Q 9/0407* (2013.01); *H01Q 1/246* (2013.01); *H01Q 1/38* (2013.01); *H01Q 1/48* (2013.01);
(Continued)

(58) Field of Classification Search
CPC ........ H01Q 9/0407; H01Q 1/246; H01Q 1/38; H01Q 1/48; H01Q 1/52; H01Q 13/10; H01Q 15/24; H01Q 21/24
See application file for complete search history.

(56) References Cited

U.S. PATENT DOCUMENTS 6,107,965 A 8/2000 Christ
2015/0255875 A1 9/2015 Jan et al.
(Continued)

FOREIGN PATENT DOCUMENTS

CN 203406415 U 1/2014
CN 106898871 A 6/2017
(Continued)

*Primary Examiner* — Dieu Hien T Duong
(74) *Attorney, Agent, or Firm* — Leydig, Voit & Mayer, Ltd.

(57) ABSTRACT

An antenna having high isolation and a low cross-polarization level, a base station, and a terminal are provided. The antenna includes a radiation layer, a feed layer, and an aperture coupling layer disposed between the radiation layer and the feed layer. The aperture coupling layer includes a metal sheet. A first feeding slot, a second feeding slot, and a middle slot are configured in the metal sheet. The middle slot is located between the first feeding slot and the second feeding slot, and is located in a weak electric field region of the metal sheet. The middle slot is configured between the first feeding slot and the second feeding slot of the metal sheet.

20 Claims, 7 Drawing Sheets

(51) Int. Cl.

| | |
|---|---|
| ***H01Q 1/38*** | (2006.01) |
| ***H01Q 1/48*** | (2006.01) |
| ***H01Q 1/52*** | (2006.01) |
| ***H01Q 13/10*** | (2006.01) |
| ***H01Q 21/24*** | (2006.01) |
| *H01Q 15/24* | (2006.01) |

(52) U.S. Cl.
CPC ............... *H01Q 1/52* (2013.01); *H01Q 13/10* (2013.01); *H01Q 15/24* (2013.01); *H01Q 21/24* (2013.01)

(56) References Cited

U.S. PATENT DOCUMENTS

| | | | |
|---|---|---|---|
| 2018/0034147 | A1 | 2/2018 | Hashimoto et al. |
| 2019/0260115 | A1 | 8/2019 | Tehran et al. |

FOREIGN PATENT DOCUMENTS

| | | | | |
|---|---|---|---|---|
| CN | 107039761 | A | * | 8/2017 |
| CN | 207165756 | U | | 3/2018 |
| CN | 110048224 | A | | 7/2019 |
| CN | 110137672 | A | | 8/2019 |
| EP | 2124292 | A2 | | 11/2009 |
| JP | 2009188895 | A | * | 8/2009 |
| KR | 102049926 | B1 | | 11/2019 |
| WO | 2018133427 | A1 | | 7/2018 |

* cited by examiner

ANTENNA HAVING HIGH ISOLATION AND LOW CROSS-POLARIZATION LEVEL, BASE STATION, AND TERMINAL

CROSS-REFERENCE TO RELATED APPLICATIONS

This application is a National Stage of International Application No. PCT/CN2020/125207, filed on Oct. 30, 2020, which claims priority to Chinese Patent Application No. 202010074376.2, filed on Jan. 22, 2020, both of which are hereby incorporated by reference in their entirety.

TECHNICAL FIELD

This application relates to the field of communication technologies, and in particular, to an antenna having high isolation and a low cross-polarization level, a base station, and a terminal.

BACKGROUND

An antenna is a front-end component in a communication system, and performance of the antenna directly affects performance of the communication system. In recent years, a dual-polarized antenna has become a research hotspot because such antenna has a low call loss, low interference, and a low installation and erection requirement, and does not need to perform land acquisition for tower construction. However, when the dual-polarized antenna is used, a cross-polarization phenomenon occurs, which has negative impact on transmit power and a received signal-to-noise ratio of the communication system. In addition, because isolation of the dual-polarized antenna often deteriorates, radiation energy of the antenna is reduced. This is unfavorable to signal propagation.

SUMMARY

An objective of embodiments of this application is to provide an antenna having high isolation and a low cross-polarization level. A cross-polarization level of the antenna can be effectively reduced, and isolation of the antenna can be significantly improved.

To achieve the foregoing objective, the technical solutions used in this application are as follows.

According to a first aspect, an antenna having high isolation and a low cross-polarization level is provided. The antenna includes at least one radiation layer, a feed layer, and an aperture coupling layer disposed between the radiation layer and the feed layer. The aperture coupling layer includes a metal sheet; a first feeding slot, a second feeding slot, and a middle slot are configured in the metal sheet; and the middle slot is located between the first feeding slot and the second feeding slot, and is located in a weak electric field region of the metal sheet.

In this embodiment of this application, the middle slot is configured between the first feeding slot and the second feeding slot of the metal sheet, so that a boundary condition of the antenna can be changed due to the middle slot without changing a radiation electric field condition of the antenna. In this way, a current, in a cross-polarization direction, generated on the antenna weakens, to reduce a cross-polarization level. In addition, an energy coupling phenomenon of the antenna is effectively relieved, to significantly improve isolation of the antenna.

Optionally, the metal sheet is polygonal and has a diagonal, the first feeding slot and the second feeding slot are respectively formed on two opposite sides of the diagonal, and the middle slot is distributed along the diagonal. The first feeding slot and the second feeding slot are symmetrically disposed based on the diagonal.

Optionally, there are a plurality of middle slots disposed at intervals, and the middle slots are distributed along the diagonal and located in the weak electric field region. Lengths of the middle slots are consistent or inconsistent.

Optionally, the weak electric field region includes a first region with relatively high electric field strength and a second region with relatively low electric field strength, where the first region and the second region are distributed along the diagonal, and the middle slot is located in the first region and/or the second region. Quantities of the middle slots in the first region may be consistent or inconsistent with that of the middle slots in the second region.

Optionally, the middle slot may be configured along a direction of the diagonal; the middle slot is configured along a length direction of the first region or the second region; the middle slot is configured along a width direction of the first region or the second region; or the middle slot is irregularly configured in the first region or the second region.

Optionally, the middle slot includes a first slot and a second slot, and the first slot and the second slot are distributed at an interval in the first region and/or the second region. The first slot and the second slot may be distributed in both the first region and the second region. Alternatively, the first slot and the second slot may be separately distributed in the first region or the second region.

Optionally, an outline of the middle slot is a rectangle, a circle, an ellipse, or an irregular shape. The outline of the middle slot may match an outline of the first region and/or an outline of the second region.

Optionally, there are two radiation layers, the two radiation layers each include a first dielectric layer and a radiation patch, the two first dielectric layers and the two radiation patches are alternately disposed in an overlapped manner, and the first dielectric layer at a lower layer is disposed on the metal sheet. The first dielectric layer is a PCB layer, and the corresponding radiation patch is attached to the first dielectric layer.

Optionally, a parasitic patch is further disposed on an upper part, away from the aperture coupling layer, of the radiation layer, and a second dielectric layer is formed between the parasitic patch and the radiation patch. The parasitic patch and the corresponding radiation patch are disposed at an interval, and the second dielectric layer is filled between the second parasitic patch and the corresponding radiation patch.

Optionally, the aperture coupling layer further includes a third dielectric layer, and the metal sheet is disposed on the third dielectric layer.

Optionally, the feed layer includes two feeding lines, the two feeding lines are attached to a side, away from the aperture coupling layer, of the third dielectric layer, and are respectively disposed corresponding to the first feeding slot and the second feeding slot; and feeding ports are configured at a location in which the two feeding lines extend to an edge of the third dielectric layer. The two feeding lines are symmetrically disposed based on the diagonal.

Optionally, the two feeding lines are disposed perpendicular to each other; in a direction perpendicular to the feed layer, the two feeding lines are symmetrically distributed based on the middle slot; and the first feeding slot and the second feeding slot are symmetrically distributed based on the middle slot. Specifically, body parts of the two feeding lines are vertically disposed, and feeding port parts of the two feeding lines are kept parallel to each other.

Optionally, the feed layer further includes a fourth dielectric layer, the two feeding lines are disposed on the fourth dielectric layer, and a metal grounding layer is attached to a bottom of the fourth dielectric layer.

Optionally, the antenna is a millimeter wave antenna or a submillimeter wave antenna.

According to a second aspect, a base station is provided, including the foregoing antenna having high isolation and a low cross-polarization level.

The base station provided in this embodiment of this application includes the foregoing antenna having high isolation and a low cross-polarization level, and the foregoing antenna can significantly reduce the cross-polarization level while ensuring relatively good isolation. In this way, transmit power of the base station is ensured, a received signal-to-noise ratio is effectively improved, radiation energy of the antenna is increased, and stable propagation of a signal is ensured.

According to a third aspect, a terminal is provided, including the foregoing antenna having high isolation and a low cross-polarization level.

The terminal provided in this embodiment of this application includes the antenna having high isolation and a low cross-polarization level, and the foregoing antenna can significantly reduce the cross-polarization level while ensuring relatively good isolation. In this way, strength of a received signal of the terminal is ensured, stability of a communication connection between the terminal and an external device is ensured, and product experience of a user is improved.

BRIEF DESCRIPTION OF DRAWINGS

To describe the technical solutions in embodiments of this application more clearly, the following briefly describes the accompanying drawings for describing embodiments or the conventional technology. It is clear that the accompanying drawings in the following description merely show some embodiments of this application, and a person of ordinary skill in the art can derive other drawings from these accompanying drawings without creative efforts.

REFERENCE NUMERALS IN THE DRAWINGS

Figure 1:
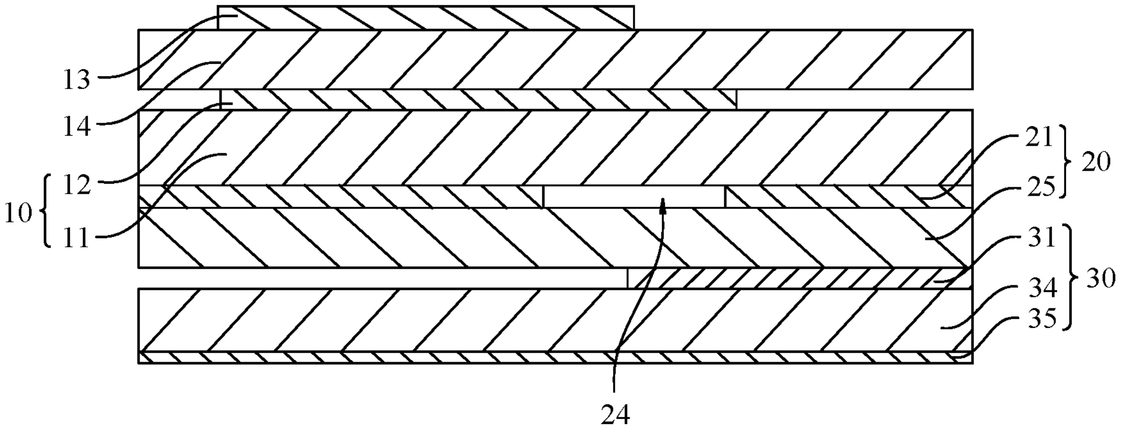
FIG. 1 is a sectional view of an antenna having high isolation and a low cross-polarization level according to an embodiment of this application.

10—Radiation layer 11—First dielectric layer 12—Radiation patch
13—Parasitic patch 14—Second dielectric layer 20—Aperture coupling layer
21—Metal sheet 22—First feeding slot 23—Second feeding slot
24—Middle slot 25—Third dielectric layer 30—Feed layer
31—Feeding line 32—Feeding port 33—Body part
34—Fourth dielectric layer 35—Metal grounding layer 211—Weak electric field region
212—Diagonal 213—First region 214—Second region
241—First slot 242—Second slot

DESCRIPTION OF EMBODIMENTS

The following describes embodiments of this application in detail. Examples of embodiments are shown in the accompanying drawings. Same or similar reference numerals are always used to represent same or similar elements or elements having same or similar functions. Embodiments described below with reference to FIG. 1 to FIG. 10 are examples, and are intended to explain this application, but cannot be understood as a limitation on this application.

In the description of this application, it should be understood that orientation or location relationships indicated by the terms "vertical", "horizontal", "away from", and the like are based on orientation or location relationships shown in the accompanying drawings, and are used only for describing this application and simplifying the description, rather than indicating or implying that an apparatus or an element in question needs to have a specific orientation or needs to be constructed and operated in a specific orientation, and therefore cannot be construed as a limitation on this application.

In addition, the terms "first", "second", "third", and "fourth" are merely used for description, and shall not be understood as an indication or implication of relative importance or implicit indication of a quantity of indicated technical features. Therefore, a feature limited by "first", "second", "third", or "fourth" may explicitly or implicitly include one or more features. In the description of this application, "a plurality of" means two or more than two, unless otherwise specifically limited.

In this application, the terms "install", "connect", "connection", "dispose", and the like should be understood in a broad sense unless otherwise expressly specified and limited. For example, the "connection" may be a fixed connection, a removable connection, or an integrated connection; may be a mechanical connection or an electrical connection; or may be a direct connection, an indirect connection through an intermediate medium, or a connection inside two components or a mutual relationship between two components. A person of ordinary skill in the art may interpret specific meanings of the foregoing terms in this application according to specific cases.

Figure 2:
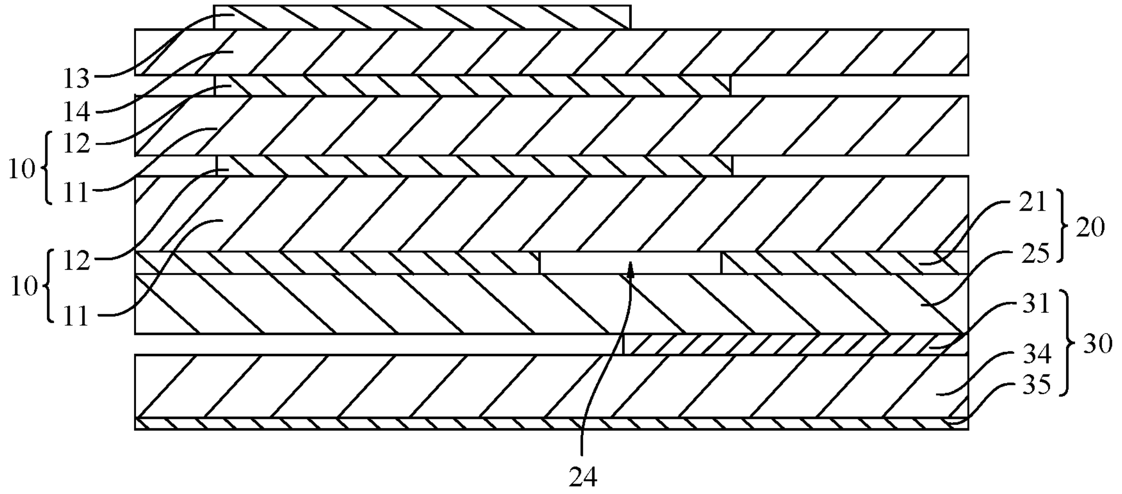
FIG. 2 is another sectional view of an antenna having high isolation and a low cross-polarization level according to an embodiment of this application.
Figure 3:
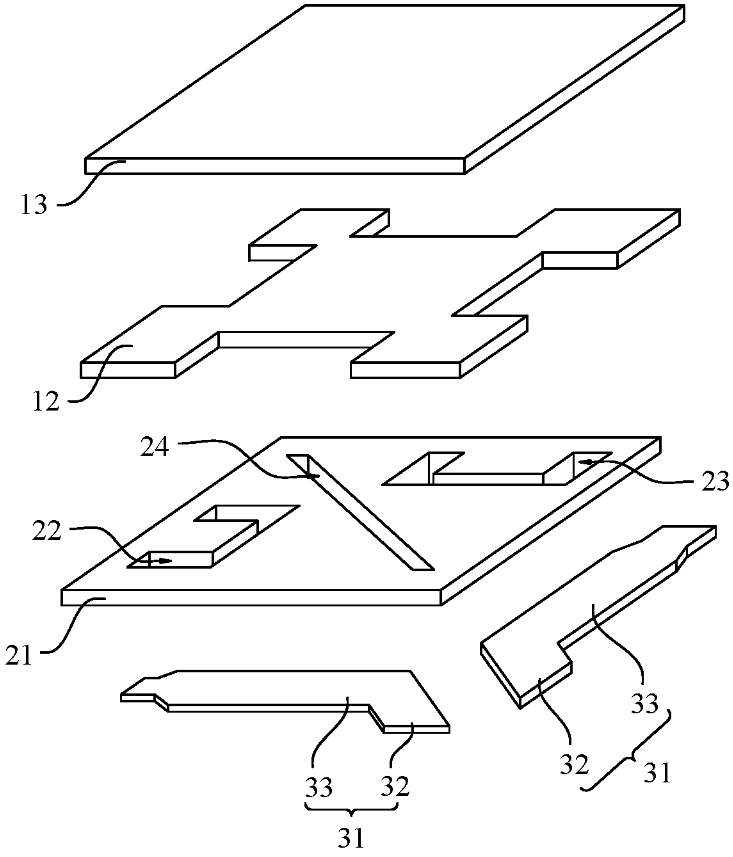
FIG. 3 is a schematic diagram of exploded structures of a parasitic patch, a radiation patch, a metal sheet, and a feeding line of an antenna having high isolation and a low cross-polarization level according to an embodiment of this application.

As shown in FIG. 1 to FIG. 3, an embodiment of this application provides an antenna having high isolation and a low cross-polarization level. The antenna is used in a base station, especially a mobile telecommunication base station. The antenna having high isolation and a low cross-polarization level includes but is not limited to a dual-polarized antenna, a single-polarized antenna, an aperture-coupled antenna, a probe feeding antenna, and the like. In addition, the foregoing antenna includes but is not limited to a millimeter wave antenna, a submillimeter wave antenna, and the like.

First, technical terms described in this embodiment of this application are described.

Aperture coupling is electromagnetic coupling formed, by using a feeding line, between two slots that do not contact each other and are slightly spaced and an antenna feeding line.

Cross polarization is a polarization component orthogonal to principal polarization.

Isolation is a spatial loss caused by a spacing between a transmit antenna and a receive antenna.

Tolerance performance is an allowed error or deviation range during processing.

Figure 4:
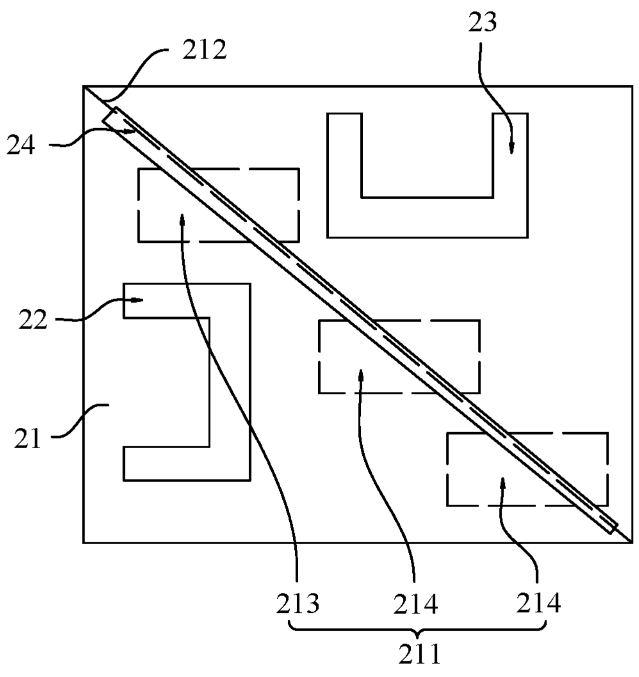
FIG. 4 is a schematic diagram of a structure of a metal sheet of an antenna having high isolation and a low cross-polarization level according to an embodiment of this application.

Specifically, the foregoing antenna includes at least one radiation layer 10, a feed layer 30, and an aperture coupling layer 20 disposed between the radiation layer 10 and the feed layer 30. Preferably, there are two radiation layers 10, to improve radiation energy of the antenna and ensure stable propagation of a signal. Refer to FIG. 3 and FIG. 4. The aperture coupling layer 20 includes a metal sheet 21. The metal sheet 21 is a copper-coated metal sheet. A first feeding slot 22, a second feeding slot 23, and a middle slot 24 are configured in the metal sheet 21. The first feeding slot 22, the second feeding slot 23, and the middle slot 24 may be formed, but is not limited to, in an etching manner. The middle slot 24 is located between the first feeding slot 22 and the second feeding slot 23, and is located in a weak electric field region 211 of the metal sheet 21. It may be understood that regions shown by dashed lines in FIG. 4 are merely approximate regions in which a weak current field is located, and boundaries of the dashed lines in the figure do not constitute a strict limitation on the weak electric field regions.

Electromagnetic coupling between the first feeding slot 22 and the second feeding slot 23 and the antenna is formed through contactless feeding, so that the antenna has a standing wave ratio characteristic of a wide frequency band. The middle slot 24 is configured between the first feeding slot 22 and the second feeding slot 23 of the metal sheet 21, so that a boundary condition of the antenna can be changed due to the middle slot 24 without changing a radiation electric field condition of the antenna, to isolate the first feeding slot 22 from the second feeding slot 23. In this way, a current, in a cross-polarization direction, generated on the antenna weakens, to reduce a cross-polarization level. In addition, an energy coupling phenomenon of the antenna is effectively relieved, to significantly improve isolation of the antenna.

A base station provided in an embodiment of this application includes the foregoing antenna having high isolation and a low cross-polarization level, and the foregoing antenna can significantly reduce the cross-polarization level while ensuring relatively good isolation. In this way, transmit power of the base station is increased, a received signal-to-noise ratio is effectively improved, radiation energy of the antenna is increased, and stable propagation of a signal is ensured.

An embodiment of this application further provides a terminal that also includes the foregoing antenna having high isolation and a low cross-polarization level. The terminal in this embodiment of this application includes but is not limited to a camera, a mobile phone, a tablet computer, a wearable device, a vehicle-mounted device, an augmented reality (AR)/virtual reality (VR) device, a laptop computer, an ultra-mobile personal computer (UMPC), a netbook, a personal digital assistant (PDA), or the like. A specific type of the terminal is not limited in this embodiment of this application. For ease of description, that a terminal device in this embodiment of this application is a mobile phone is used an example for description. It should be understood that this should not be construed as a limitation on this application.

That the terminal provided in this embodiment of this application is a mobile phone is used an example. The mobile phone includes the antenna having high isolation and a low cross-polarization level, and the antenna can significantly reduce the cross-polarization level while ensuring relatively good isolation. In this way, strength of a signal received by the mobile phone is improved, so that stability of a communication connection between the mobile phone and an external device is improved. From a perspective of user experience, call quality and data transmission stability of the mobile phone are improved, and user product experience is improved.

In some other embodiments of this application, as shown in FIG. 2 to FIG. 4, the metal sheet 21 is polygonal and has a diagonal 212. The first feeding slot 22 and the second feeding slot 23 are respectively formed on two opposite sides of the diagonal 212, and the middle slot 24 is distributed along the diagonal 212. Specifically, the middle slot 24 is disposed along the diagonal 212, indicating that the first feeding slot 22 and the second feeding slot 23 can be symmetrical based on the middle slot 24. In this way, the boundary condition of the antenna can be further optimized, so that intensity of a current, in the cross-polarization direction, generated on the antenna is further reduced, to further reduce the cross-polarization level of the antenna.

Optionally, the first feeding slot 22 and the second feeding slot 23 are symmetrically disposed based on the diagonal 212. In this way, distances of any group of symmetric points of the first feeding slot 22 and the second feeding slot 23 relative to the diagonal 212 are equal, so that boundary conditions of the first feeding slot 22 and the second feeding slot 23 tend to be consistent, to further reduce intensity of a current, in the cross-polarization direction, generated on the antenna.

In some other embodiments of this application, as shown in FIG. 4, there are a plurality of middle slots 24 disposed at intervals, and the middle slots 24 are distributed along a diagonal 212 and are located in weak electric field regions 211. Specifically, there may be the plurality of middle slots 24, so that the middle slots 24 can be disposed, in a targeted manner, in the weak electric field regions 211 distributed along the diagonal 212. For example, refer to FIG. 4, at a location in which the weak electric field regions 211 are relatively concentrated, the plurality of middle slots 24 may be disposed corresponding to all the weak electric field regions 211, but at a location in which the weak electric field regions 211 are relatively sparse, one or two middle slots 24 may be disposed corresponding to the weak electric field regions 211. This implements targeted distribution of the middle slots 24 corresponding to the weak electric field regions 211, implements convergence of the boundary conditions of the first feeding slot 22 and the second feeding slot 23, and further relieves the energy coupling phenomenon of the antenna, to improve isolation of the antenna.

Figure 5:
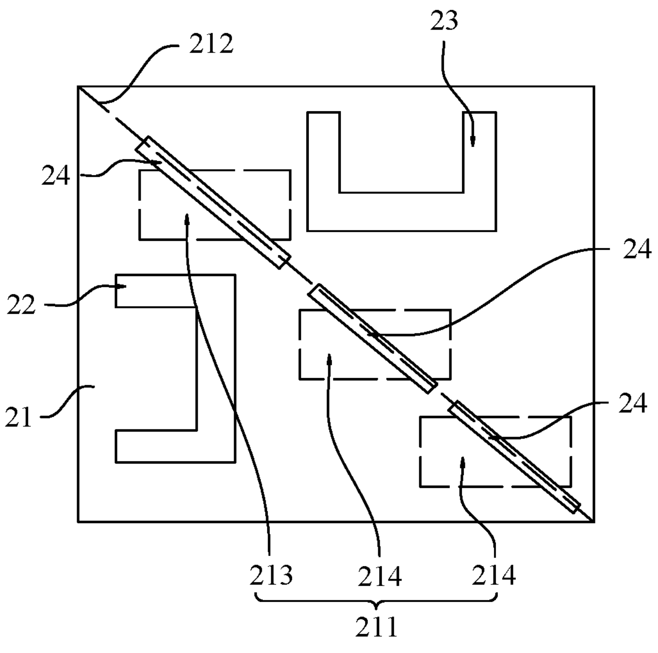
FIG. 5 is a schematic diagram 1 of a structure of a metal sheet of an antenna having high isolation and a low cross-polarization level according to an embodiment of this application.

In some other embodiments of this application, as shown in FIG. 4 and FIG. 5, a weak electric field region 211 includes a first region 213 with relatively high electric field strength and second regions 214 with relatively low electric field strength. The first region 213 and the second regions 214 are distributed along a diagonal 212. Middle slots 24 may be located in the first region 213 or the second regions 214. Alternatively, the middle slots 24 may be disposed in the first region 213 and the second regions 214.

Specifically, one or a plurality of middle slots 24 may be located in the first region 213 or the second regions 214. When the plurality of middle slots 24 are located in the first region 213 with relatively high electric field strength, the energy coupling phenomenon may be fully relieved, to significantly improve isolation of the antenna and effectively reduce the cross-polarization level. When the plurality of middle slots 24 are located in the second regions 214 with relatively low electric field strength, the cross-polarization level can be effectively reduced.

Figure 6:
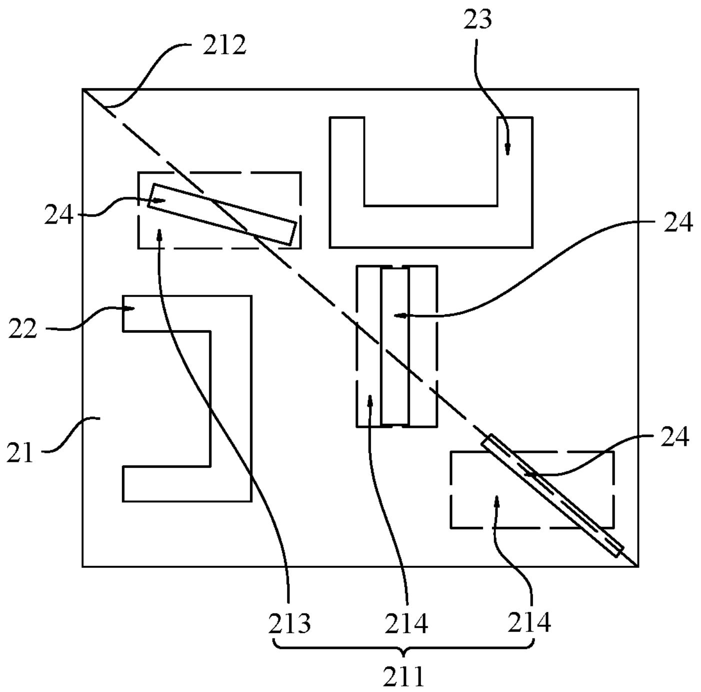
FIG. 6 is a schematic diagram 2 of a structure of a metal sheet of an antenna having high isolation and a low cross-polarization level according to an embodiment of this application.

As shown in FIG. 6, optionally, a middle slot 24 in a first region 213 and/or a second region 214 may be configured in a direction of a diagonal 212, a length direction of the first region 213 or the second region 214, or a width direction of the first region 213 or the second region 214, or configured in the first region 213 or the second regions 214 irregularly, or the like. The middle slot 24 may be configured in a direction in which a relatively large area of the first region 213 and/or the second regions 214 can be covered.

Optionally, one or more middle slots 24 may be located in the first region 213 and the second region 214. In this way, the middle slots 24 can cover a region with relatively low electric field strength in a weak electric field and a region with relatively high electric field strength in the weak electric field. Further, isolation of the antenna is effectively improved and the cross-polarization level is suppressed.

Optionally, when there is one middle slot 24, a length of the middle slot 24 is close to that of the diagonal 212. The length of the middle slot 24 is close to that of the diagonal 212, so that the middle slot 24 can cover most regions that are of a weak electric field and that are distributed along the diagonal 212. In this way, isolation of the antenna is further improved, and the cross-polarization level is further effectively suppressed.

Figure 7:
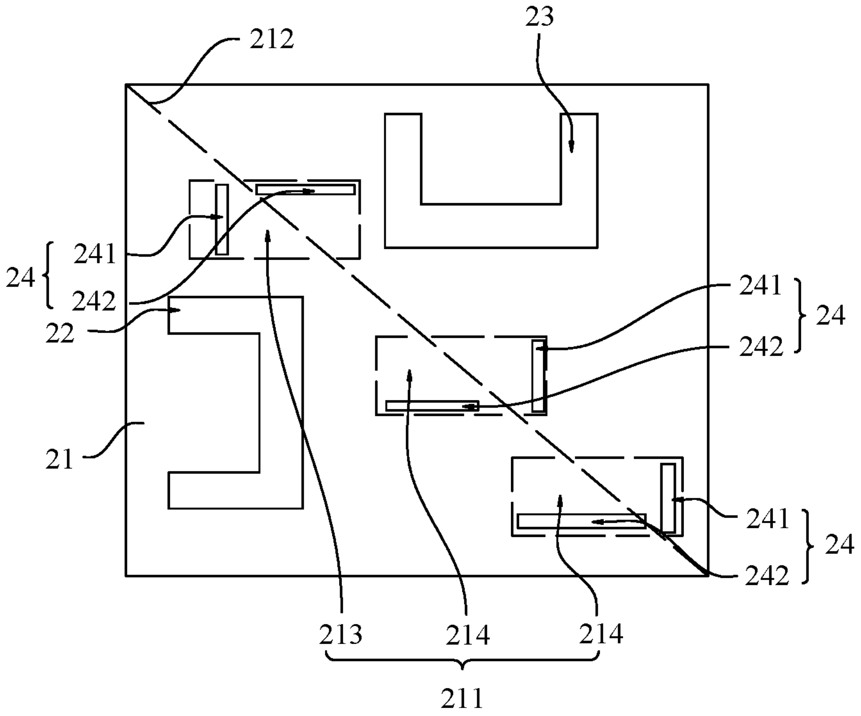
FIG. 7 is a schematic diagram 3 of a structure of a metal sheet of an antenna having high isolation and a low cross-polarization level according to an embodiment of this application.

As shown in FIG. 7, optionally, a middle slot 24 includes a first slot 241 and a second slot 242. The first slot 241 and the second slot 242 are spaced in a first region 213 and/or second regions 214. Specifically, to cover the corresponding first region 213 or the corresponding second regions 214 as much as possible, the first slot 241 and the second slot 242 are spaced in the first region 213 and/or the second regions 214. In this way, isolation of the antenna can be further significantly improved and the cross-polarization level can be effectively reduced. Certainly, according to an actual requirement, the middle slot 24 can be further split into three or more slots.

Optionally, an outline of the middle slot 24 is a rectangle, a circle, an ellipse, or an irregular shape. The outline of the middle slot 24 is a projected outline of the middle slot 24 relative to a feed layer 30, and the outline of the middle slot 24 may match an outline of the first region 213 and/or an outline of the second region 214.

In some other embodiments of this application, as shown in FIG. 1, there are two radiation layers 10, the two radiation layers each include a first dielectric layer 11 and a radiation patch 12, the two first dielectric layers 11 and the two radiation patches 12 are alternately disposed in an overlapped manner, and the first dielectric layer 11 at a lower layer is disposed on the metal sheet 21. Specifically, the radiation patch 12 may implement radiation propagation of an antenna signal, and the plurality of radiation patches 12 may implement enhancement processing on radiation energy of the antenna, to further improve a gain of the antenna. In addition, the radiation patch 12 is disposed on the first dielectric layer 11, so that the first dielectric layer 11 can ensure structural strength of the radiation patch 12, and provide insulation protection for the radiation patch 12.

In some other embodiments of this application, as shown in FIG. 1 to FIG. 3, a parasitic patch 13 is further disposed on an upper part, away from the aperture coupling layer 20, of the radiation layer 10, and a second dielectric layer 14 is formed between the parasitic patch 13 and the radiation patch 12. Specifically, on the basis of the radiation patch 12, the parasitic patch 13 is disposed, so that the parasitic patch 13 may form a resonance loop in the antenna. Therefore, when a resonance frequency of the parasitic patch 13 is close to that of the antenna, an impedance bandwidth of the antenna can be significantly expanded. Optionally, there may be a plurality of parasitic patches 13. The plurality of parasitic patches 13 are disposed, so that the impedance bandwidth of the antenna can be expanded in a successive recursive manner.

In some other embodiments of this application, the second dielectric layer 14 is a foam layer or an air layer. Specifically, because each of the foam layer and the air layer has a relatively high dielectric constant and relatively high breakdown field strength, the second dielectric layer 14 is set as the foam layer or the air layer. This means that an insulation protection layer is disposed between the parasitic patch 13 and the radiation patch 12. Therefore, mutual interference between the parasitic patch 13 and the radiation patch 12 is avoided.

Optionally, the second dielectric layer 14 is the foam layer. In this way, the foam layer can provide effective support for the parasitic patch 13, and implement good insulation protection for the parasitic patch 13 and the corresponding radiation patch 12.

In some other embodiments of this application, as shown in FIG. 1 and FIG. 2, the aperture coupling layer 20 further includes a third dielectric layer 25, and the metal sheet 21 is formed on the third dielectric layer 25. Specifically, the metal sheet 21 may be welded and fixed onto the third dielectric layer 25. The third dielectric layer 25 is disposed, to provide stable support for the metal sheet 21.

In some other embodiments of this application, as shown in FIG. 1 to FIG. 3, the feed layer 30 includes two feeding lines 31; and the two feeding lines 31 are attached to a side, away from the aperture coupling layer 20, of the third dielectric layer 25, and are respectively disposed corresponding to the first feeding slot 22 and the second feeding slot 23. Feeding ports 32 are provided at a location in which the two feeding lines 31 extend to an edge of the third dielectric layer 25. Specifically, the two feeding lines 31 are disposed at locations corresponding to the first feeding slot 22 and the second feeding slot 23, to implement dual-polarization performance of the antenna.

In some other embodiments of this application, as shown in FIG. 3, the two feeding lines 31 are perpendicular to each other. Specifically, body parts 33 of the two feeding lines 31 are vertically disposed. In a direction perpendicular to the feed layer 30, the two feeding lines 31 are symmetrically distributed based on the middle slot 24. The first feeding slot 22 and the second feeding slot 23 are symmetrically distributed based on the middle slot 24. Feeding ports 32 of the two feeding lines 31 are kept parallel. Therefore, horizontal/vertical dual polarization or plus or minus 45° dual polarization is implemented.

In some other embodiments of this application, as shown in FIG. 1 and FIG. 2, the feed layer 30 further includes a fourth dielectric layer 34, both the two feeding lines 31 are disposed on the fourth dielectric layer 34, and a metal grounding layer 35 is attached to a side, away from the feeding line 31, of the fourth dielectric layer 34. Specifically, each of the first dielectric layer 11, the third dielectric layer 25, and the fourth dielectric layer 34 is a PCB layer. The metal grounding layer 35 is attached to the bottom of the fourth dielectric layer 34, so that the entire antenna can be grounded. Therefore, static electricity carried on each part of the antenna can be effectively eliminated. Optionally, the antenna is a millimeter wave antenna or a submillimeter wave antenna.

Figure 8:
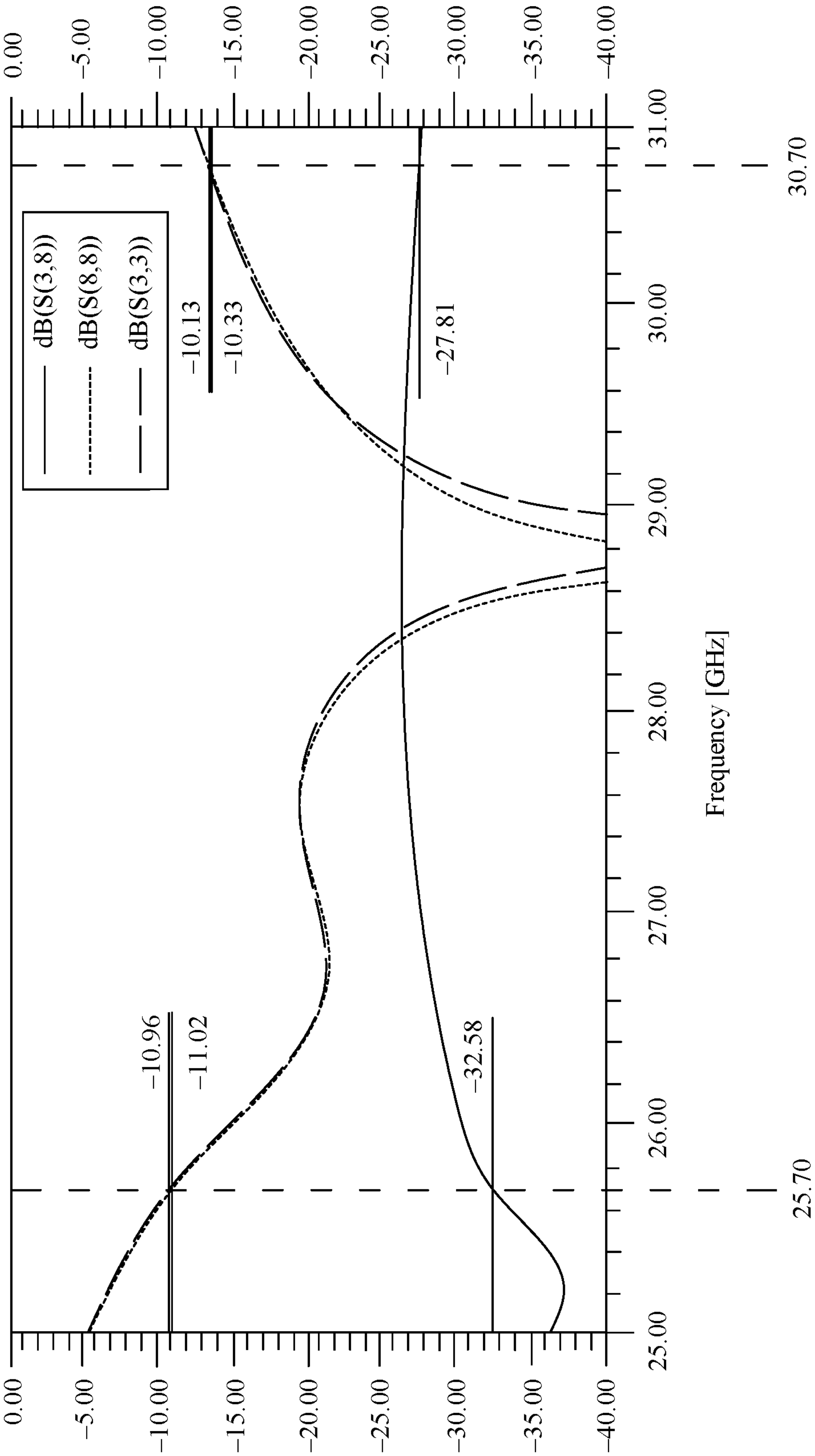
FIG. 8 is a diagram of a relationship in which a return loss of a feeding port of an antenna having high isolation and a low cross-polarization level and isolation change with a frequency according to an embodiment of this application.
Figure 9:
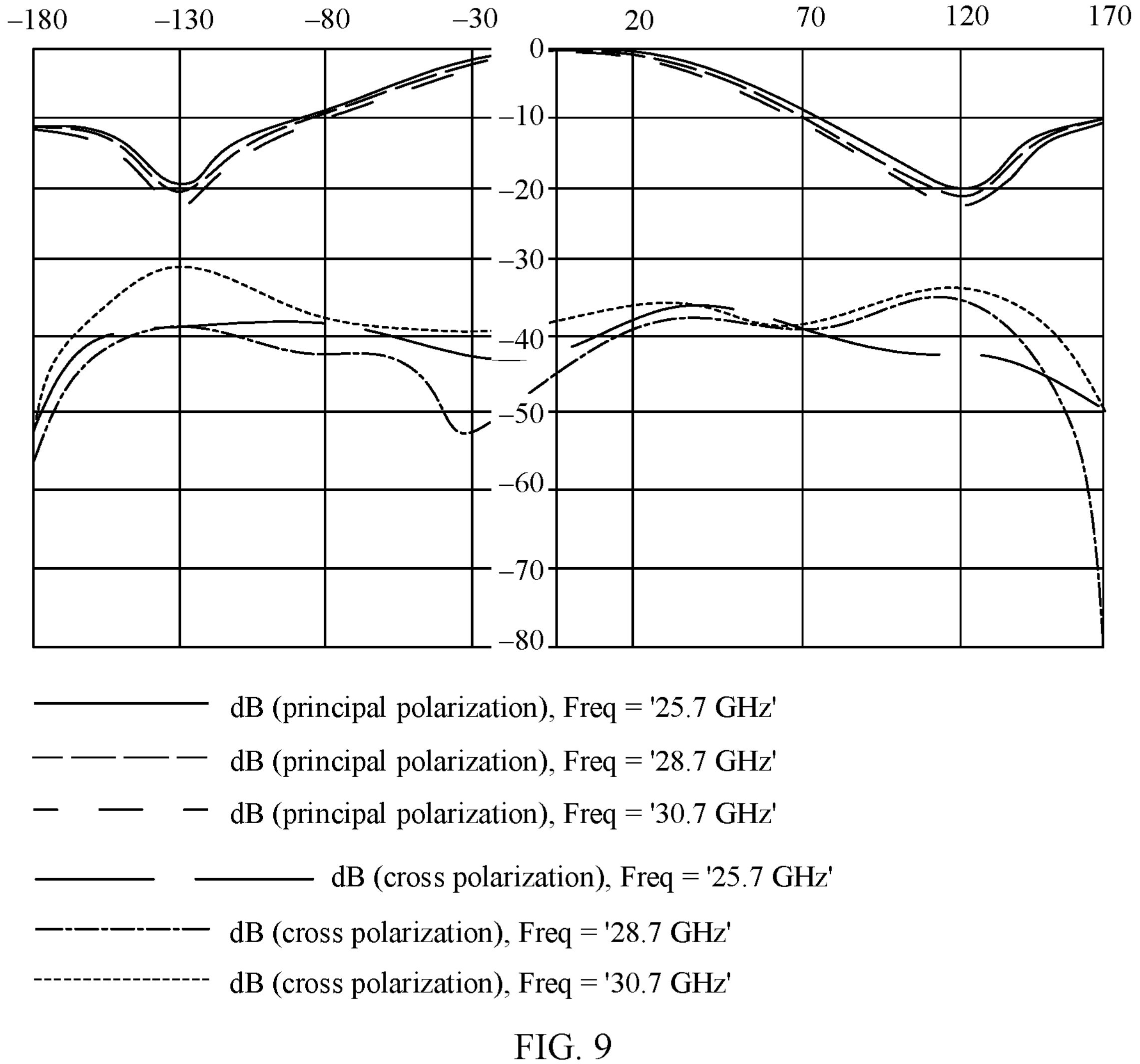
FIG. 9 is a diagram of a relationship between a polarization direction and a cross-polarization level during horizontal polarization of a feeding port of an antenna having high isolation and a low cross-polarization level according to an embodiment of this application.
Figure 10:
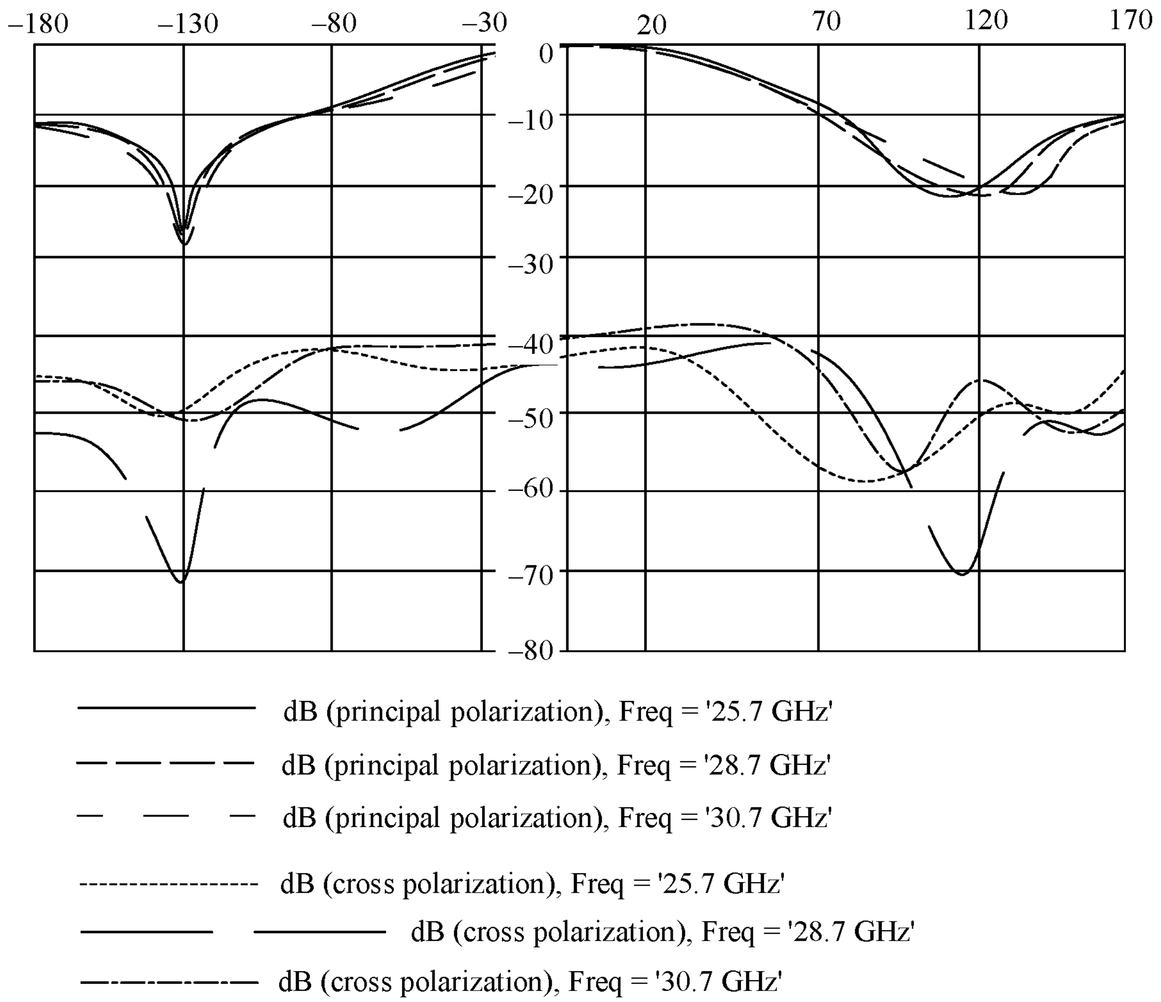
FIG. 10 is a diagram of a relationship between a polarization direction and a cross-polarization level during vertical polarization of a feeding port of an antenna having high isolation and a low cross-polarization level according to an embodiment of this application.

As shown in FIG. 8 to FIG. 10, in an embodiment of this application, an angle of a diagonal 212 is 45°, there are three middle slots 24, the three middle slots 24 respectively correspond to one first region 213 and two second regions 214, and a total area of the three middle slots 24 covers most regions of a metal sheet along a length direction of the diagonal 212. In this case, in a frequency band from 25.7 GHz to 30.7 GHZ, return losses at two feeding ports 32 are less than −10 dB, isolation is greater than 28 dB, and a cross-polarization level of horizontal polarization and a cross-polarization level of vertical polarization each are lower than 35 dB.

In conclusion, the foregoing description is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An antenna, comprising:

at least one radiation layer;

a feed layer; and an aperture coupling layer disposed between the at least one radiation layer and the feed layer, wherein the aperture coupling layer comprises a metal sheet;

wherein a first feeding slot, a second feeding slot, and a plurality of middle slots are configured in the metal sheet;

wherein the plurality of middle slots are located between the first feeding slot and the second feeding slot, and each middle slot of the plurality of middle slots is located in a weak electric field region of the metal sheet;

wherein the metal sheet is polygonal and has a diagonal, the first feeding slot and the second feeding slot are respectively formed on two opposite sides of the diagonal, and each middle slot of the plurality of middle slots is distributed along the diagonal; and wherein each middle slot of the plurality of middle slots is formed in an etching manner and is fully enclosed by metal of the metal sheet.

2. The antenna according to claim 1, wherein the weak electric field region comprises a first region with relatively high electric field strength and a second region with relatively low electric field strength, the first region and the second region are distributed along the diagonal, and at least one middle slot of the plurality of middle slots is located in at least one of the first region and the second region.

3. The antenna according to claim 2, wherein the at least one middle slot comprises a first slot and a second slot, and the first slot and the second slot are distributed at the interval in the first region and/or the second region.

4. The antenna according to claim 1, wherein the at least one radiation layer includes two radiation layers, the two radiation layers each comprise a first dielectric layer and a radiation patch, the two first dielectric layers and the two radiation patches are alternately disposed in an overlapped manner, and the first dielectric layer at a lower layer is disposed on the metal sheet.

5. The antenna according to claim 4, wherein, for each radiation patch, a parasitic patch is further disposed on a side, away from the aperture coupling layer, of the radiation patch, and a second dielectric layer is formed between the parasitic patch and the radiation patch.

6. The antenna according to claim 1, wherein the aperture coupling layer further comprises a third dielectric layer, and the metal sheet is disposed on the third dielectric layer.

7. The antenna according to claim 6, wherein the feed layer comprises two feeding lines, the two feeding lines are attached to a side, away from the aperture coupling layer, of the third dielectric layer, and are respectively disposed corresponding to the first feeding slot and the second feeding slot, and feeding ports are configured at a location in which the two feeding lines extend to an edge of the third dielectric layer.

8. The antenna according to claim 7, wherein the two feeding lines are disposed perpendicular to each other;

wherein in a direction perpendicular to the feed layer, the two feeding lines are symmetrically distributed based on the plurality of middle slots; and wherein the first feeding slot and the second feeding slot are symmetrically distributed based on the plurality of middle slots.

9. The antenna according to claim 7, wherein the feed layer further comprises a fourth dielectric layer, the two feeding lines are disposed on the fourth dielectric layer, and a metal grounding layer is attached to a side, away from the feeding lines, of the fourth dielectric layer.

10. A base station, comprising:

an antenna, the antenna comprising at least one radiation layer, a feed layer, and an aperture coupling layer disposed between the at least one radiation layer and the feed layer, wherein the aperture coupling layer comprises a metal sheet;

wherein a first feeding slot, a second feeding slot, and a plurality of middle slots are configured in the metal sheet;

wherein the plurality of middle slots are located between the first feeding slot and the second feeding slot, and each middle slot of the plurality of middle slots is located in a weak electric field region of the metal sheet;

wherein the metal sheet is polygonal and has a diagonal, the first feeding slot and the second feeding slot are respectively formed on two opposite sides of the diagonal, and each middle slot of the plurality of middle slots is distributed along the diagonal; and wherein each middle slot of the plurality of middle slots is formed in an etching manner and is fully enclosed by metal of the metal sheet.

11. The base station according to claim 10, wherein the weak electric field region comprises a first region with relatively high electric field strength and a second region with relatively low electric field strength, the first region and the second region are distributed along the diagonal, and at least one middle slot of the plurality of middle slots is located in at least one of the first region and the second region.

12. The base station according to claim 11, wherein the at least one middle slot comprises a first slot and a second slot, and the first slot and the second slot are distributed at the interval in the first region and/or the second region.

13. The base station according to claim 10, wherein the at least one radiation layer includes two radiation layers, the two radiation layers each comprise a first dielectric layer and a radiation patch, the two first dielectric layers and the two radiation patches are alternately disposed in an overlapped manner, and the first dielectric layer at a lower layer is disposed on the metal sheet.

14. The base station according to claim 13, wherein, for each radiation patch, a parasitic patch is further disposed on a side, away from the aperture coupling layer, of the radiation patch, and a second dielectric layer is formed between the parasitic patch and the radiation patch.

15. A terminal, comprising:

an antenna, the antenna comprising at least one radiation layer, a feed layer, and an aperture coupling layer disposed between the at least one radiation layer and the feed layer, wherein the aperture coupling layer comprises a metal sheet;

wherein a first feeding slot, a second feeding slot, and a plurality of middle slots are configured in the metal sheet;

wherein the plurality of middle slots are located between the first feeding slot and the second feeding slot, and each middle slot of the plurality of middle slots is located in a weak electric field region of the metal sheet;

wherein the metal sheet is polygonal and has a diagonal, the first feeding slot and the second feeding slot are respectively formed on two opposite sides of the diagonal, and each middle slot of the plurality of middle slots is distributed along the diagonal; and wherein each middle slot of the plurality of middle slots is formed in an etching manner and is fully enclosed by metal of the metal sheet.

16. The terminal according to claim 15, wherein the weak electric field region comprises a first region with relatively high electric field strength and a second region with relatively low electric field strength, the first region and the second region are distributed along the diagonal, and at least one middle slot of the plurality of middle slots is located in at least one of the first region and the second region.

17. The terminal according to claim 16, wherein the at least one middle slot comprises a first slot and a second slot, and the first slot and the second slot are distributed at the interval in the first region and/or the second region.

18. The terminal according to claim 15, wherein the at least one radiation layer includes two radiation layers, the two radiation layers each comprise a first dielectric layer and a radiation patch, the two first dielectric layers and the two radiation patches are alternately disposed in an overlapped manner, and the first dielectric layer at a lower layer is disposed on the metal sheet.

19. The terminal according to claim 18, wherein, for each radiation patch, a parasitic patch is further disposed on a side, away from the aperture coupling layer, of the radiation patch, and a second dielectric layer is formed between the parasitic patch and the radiation patch.

20. The terminal according to claim 15, wherein the feed layer comprises two feeding lines, the two feeding lines are respectively disposed corresponding to the first feeding slot and the second feeding slot, and the two feeding lines are disposed perpendicular to each other;

wherein in a direction perpendicular to the feed layer, the two feeding lines are symmetrically distributed based on the plurality of middle slots; and wherein the first feeding slot and the second feeding slot are symmetrically distributed based on the plurality of middle slots.

* * * * *